Figure 1:
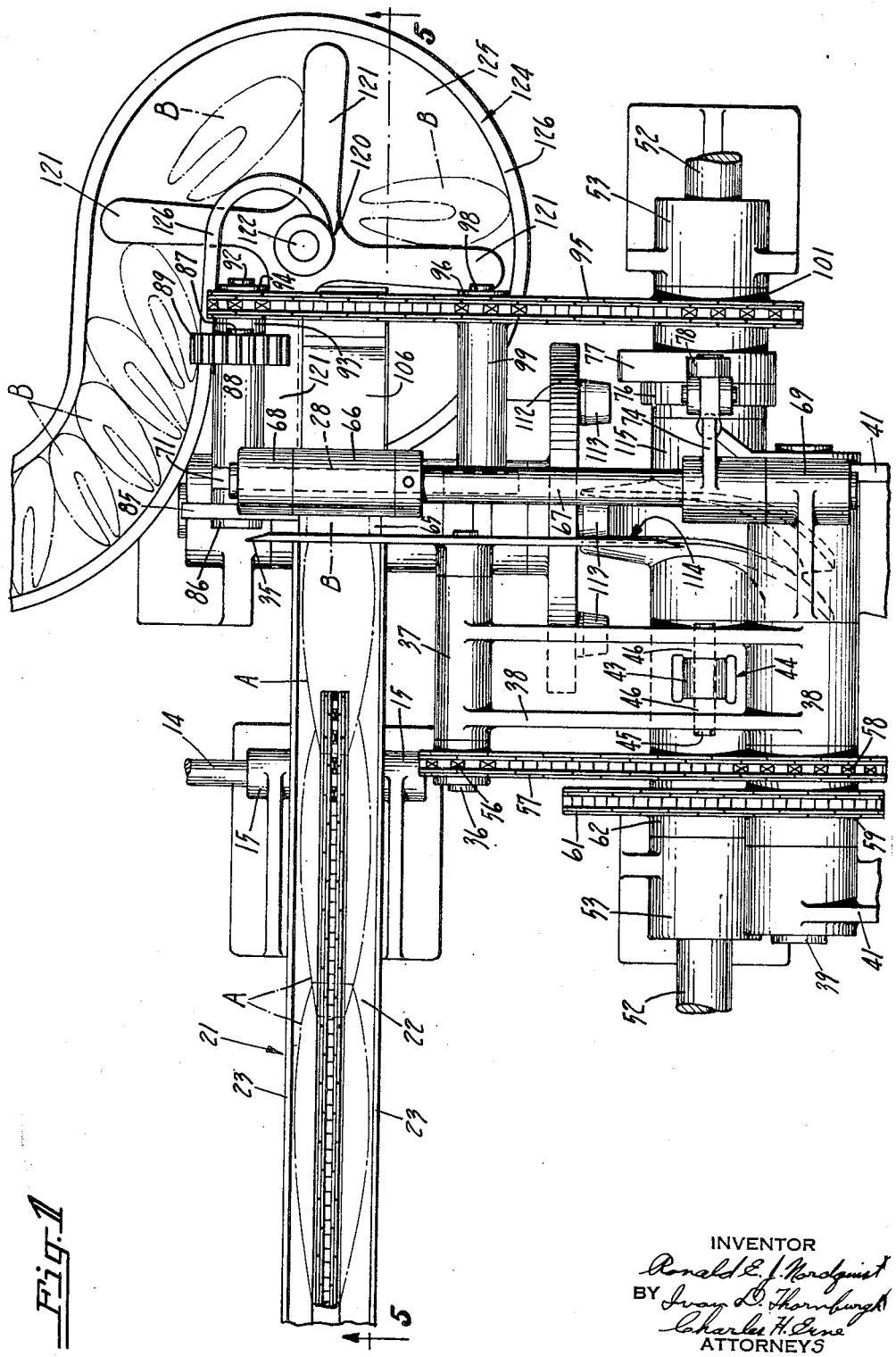

Jan. 8, 1952  R. E. J. NORDQUIST  2,581,432
CUTTER AND TRANSFER DEVICE FOR FISH CANNING MACHINES
Filed June 27, 1946  4 Sheets-Sheet 1

INVENTOR
Ronald E. J. Nordquist
BY
ATTORNEYS

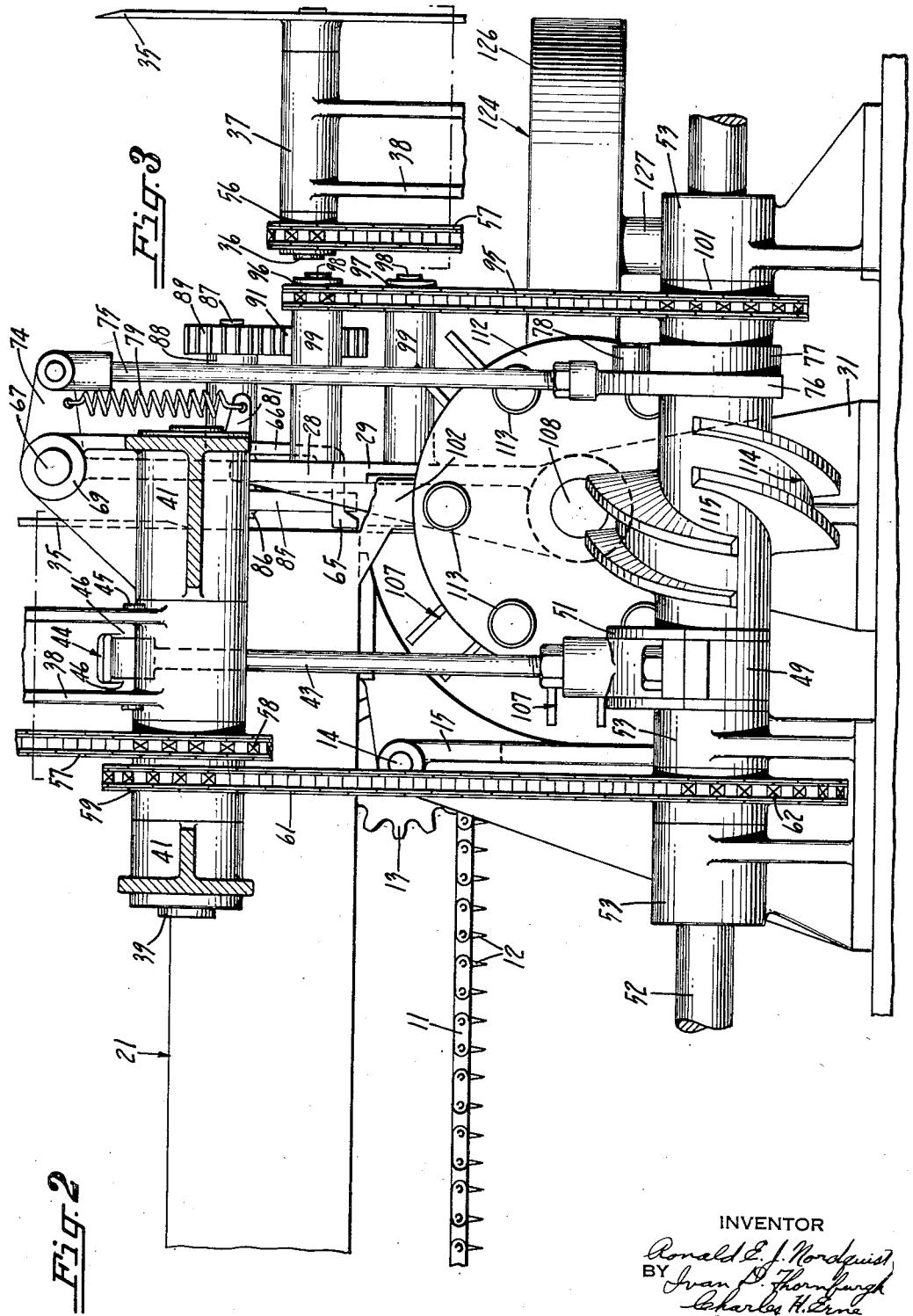

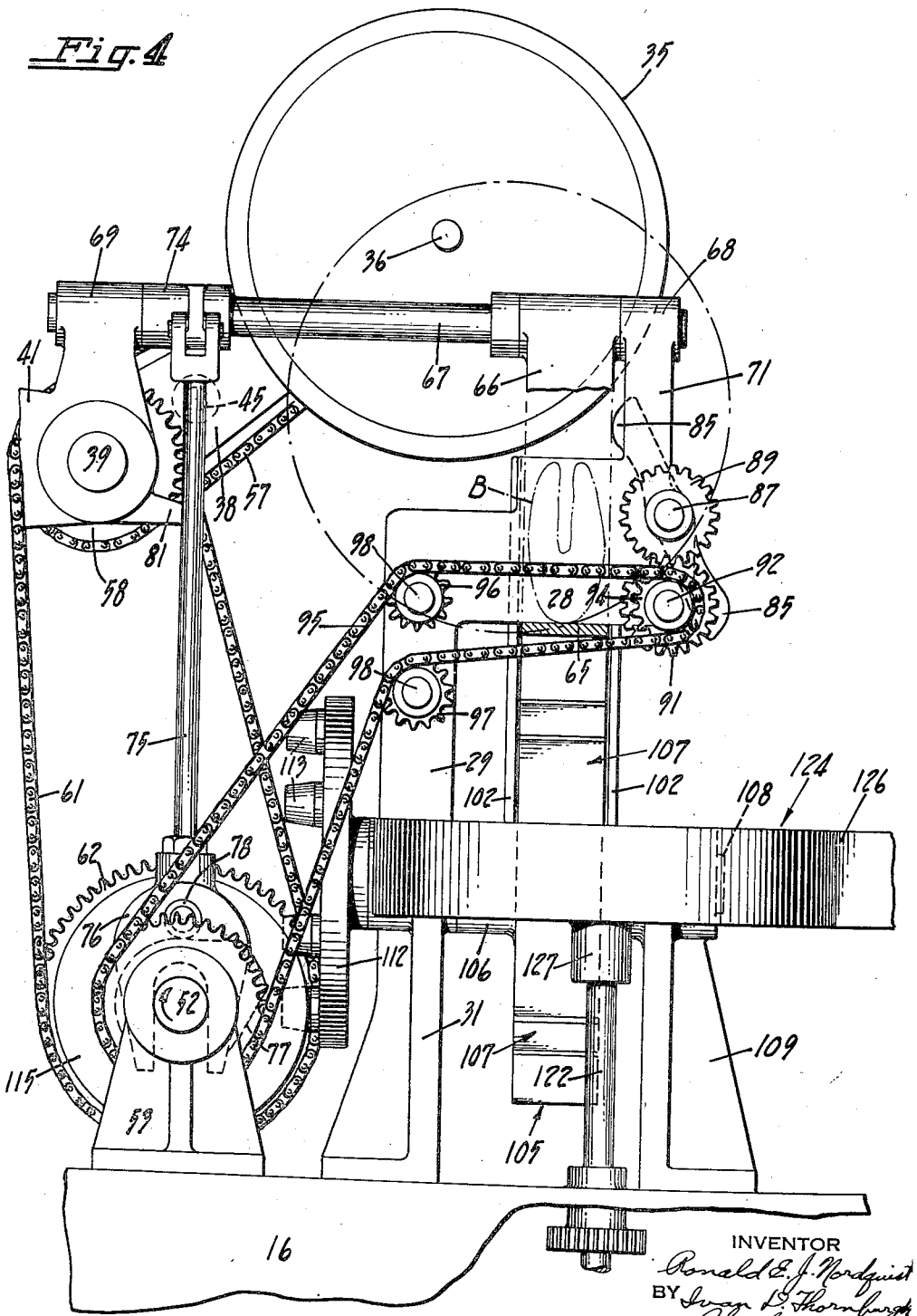

Jan. 8, 1952 R. E. J. NORDQUIST 2,581,432
CUTTER AND TRANSFER DEVICE FOR FISH CANNING MACHINES
Filed June 27, 1946 4 Sheets-Sheet 4

INVENTOR
Ronald E. J. Nordquist
BY
ATTORNEYS

Patented Jan. 8, 1952

2,581,432

UNITED STATES PATENT OFFICE 2,581,432

CUTTER AND TRANSFER DEVICE FOR FISH CANNING MACHINES

Ronald E. J. Nordquist, Maplewood, N. J., assignor to American Can Company, New York, N. Y., a corporation of New Jersey Application June 27, 1946, Serial No. 679,849

8 Claims. (Cl. 17—4)

1

The present invention relates to a fish canning machine and has particular reference to improved and simplified devices for cutting the fish into can sizes and for placing the cut pieces into a predetermined position to facilitate canning.

An object of the invention is the provision of devices in a canning machine wherein fish to be canned is cut into pieces of a predetermined length while the fish are maintained in a position which facilitates the cutting operation, the pieces of fish after being cut being turned into a different position which facilitates packing them into cans.

Another object is the provision of such devices wherein a rotary movement is utilized to facilitate turning of the fish pieces into proper position for canning.

Another object is the provision of devices wherein the portion of the fish to be cut off is releasably supported so that transfer of the fish pieces to the turning device may be facilitated.

Another object is the provision of devices wherein the cut pieces of fish are transferred from the support to the turning device in time with the cutting operation.

Another object is the provision of a pivotally mounted rotatable cutter which is movable toward and away from the fish in time with the other operating parts of the machine to facilitate transverse cutting of the fish while the fish are fed into the machine in an endwise relation.

Numerous other objects and advantages of the invention will be apparent as it is better understood from the following description, which, taken in connection with the accompanying drawings, discloses a preferred embodiment thereof.

Figure 5:
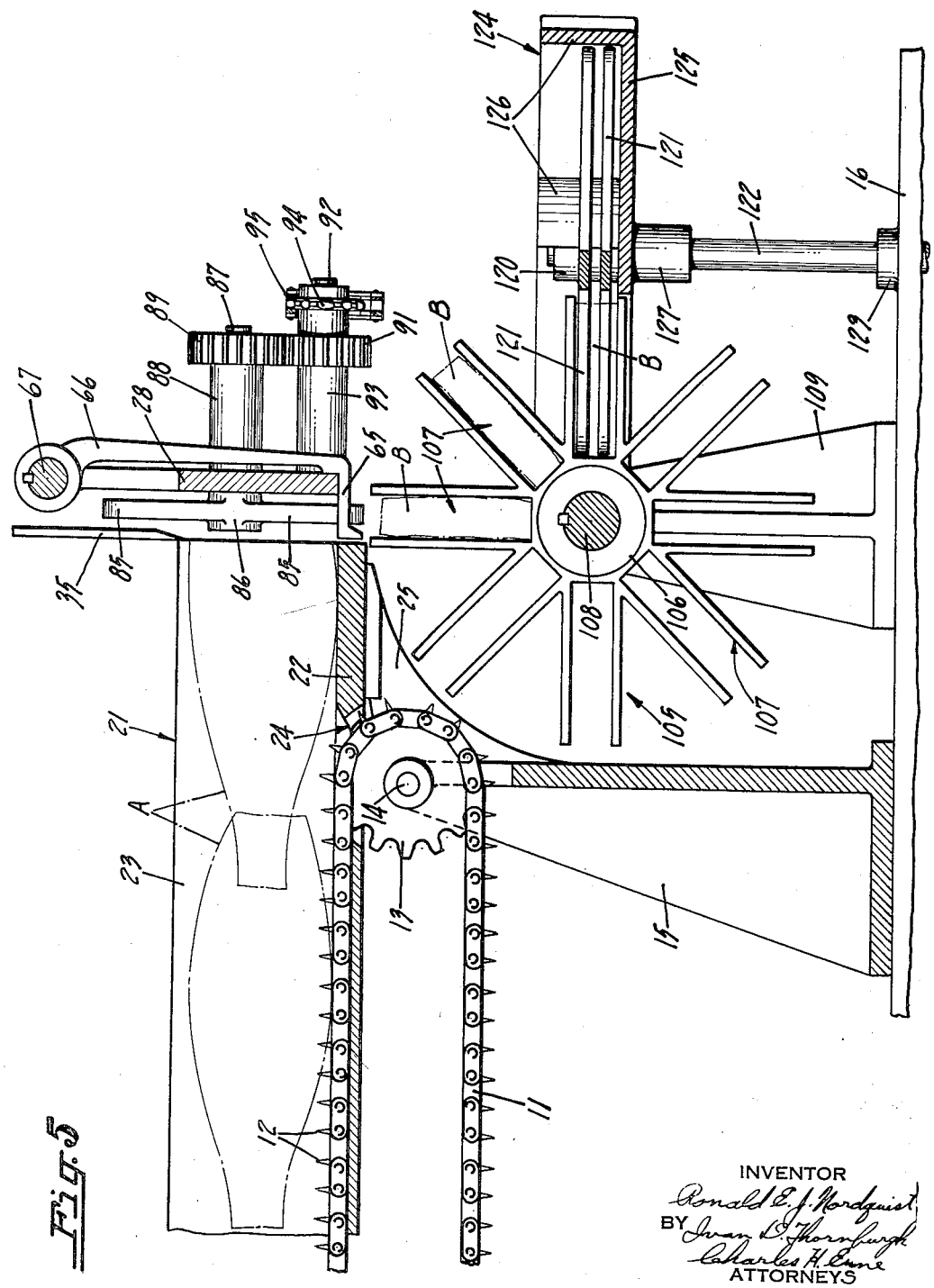

Referring to the drawings:

Figure 1 is a top plan view of a portion of a fish canning machine embodying the instant invention, with parts broken away;

Figs. 2 and 3 taken together illustrate a side elevation of the portion of the machine shown in Fig. 1, with parts broken away;

Fig. 4 is an end elevation, with parts broken back and parts shown in section; and Fig. 5 is a section taken substantially along the line 5—5 in Fig. 1.

As a preferred embodiment of the instant invention the drawings illustrate the fish entrance end of a machine for cutting fish A (Fig. 1) such as salmon and the like into measured lengths B and for packing these fish pieces into cans. The invention relates to only that portion of the machine which cuts the fish into predetermined lengths and then turns the cut pieces into a position convenient for placing them into the cans.

The fish A after dressing are fed endwise into the machine by an endless chain conveyor 11 (Figs. 2 and 5) having spaced spikes 12 on which the fish are impaled for advancement with the conveyor, the tail of one fish being inserted into the belly of the next following fish. The machine end of the conveyor operates over a driving sprocket 13 which is mounted on a drive shaft 14. The drive shaft is journaled in bearing brackets 15 bolted onto a frame 16 which may be the main frame of the canning machine. The drive shaft 14 preferably is intermittently rotated in any suitable manner in time with the other moving parts of the machine so that the fish are advanced in an intermittent or step-by-step movement.

During this advancement of the fish by the conveyor 11, the fish are supported and guided by a runway 21 having a floor 22 and spaced and parallel side guide rails 23. The floor of the runway is formed with a clearance slot 24 for the conveyor 11. The machine end of the runway is supported on members 25 which extend out from the bearing brackets 15.

The fish moving along the runway 21 are located in a predetermined position prior to cutting by a stationary stop plate or gauging element 28 disposed adjacent the inner end of the runway. This stop plate extends across the end of the runway and is located in spaced relation therefrom a distance equal to the length of the piece to be severed from the fish. The stop plate is secured to the upper end of a web 29 (Fig. 4) formed on a bearing bracket 31 bolted to the machine frame 16.

During a feeding movement of the intermittently operated conveyor 11 the innermost fish A in the line passing along the runway is advanced beyond the end of the runway until the forward end comes into engagement with the stop plate 28. This engagement arrests further advancement of the fish and thus locates the front end of the fish a predetermined measured distance from the inner end of the runway.

Cutting off of this measured length of fish is effected preferably by a rotatable disc cutter or knife 35 which is disposed closely adjacent the inner end of the runway 21. The cutter is mounted in a vertical position on a shaft 36 journaled in a bearing 37 formed on the inner end of a swing arm 38. The pivot end of the swing arm is loosely mounted on a rotatable sprocket shaft 39 which serves as a pivot shaft for the arm. The shaft is carried in a pair of spaced bearing brackets 41 which are secured to the machine frame 16 in any suitable manner.

In cutting off the fish the swing arm 38 is rocked vertically at the time advancement of the fish stops along the runway 21. This movement of the arm swings the cutter 35 from a normal position above the runway through an arcuate path of travel across and close to the inner end of the runway. During this movement of the arm the cutter cuts across the fish projecting beyond the inner end of the runway and thus severs a fish piece B from the fish mass. As soon as the fish piece B has been severed, the cutter immediately returns to its normal position above the runway while the severed fish piece is removed and the remaining fish in the runway is advanced for another cutting operation.

The swinging movement of the arm 38 preferably is brought about by a vertical connecting rod 43 (Figs. 1, 2) the upper end of which extends through an opening 44 in the arm and is mounted on a pivot pin 45. The ends of this pivot pin are carried in bearings 46 formed in the arm adjacent the clearance opening 44.

The lower end of the connecting rod 43 is secured into an eccentric block 49 (Fig. 2) which surrounds an eccentric 51 formed on a horizontal drive shaft 52. This drive shaft is journaled in bearing brackets 53 bolted to the machine frame 16 and is rotated in any suitable manner in time with the conveyor 11.

Rotation of the cutter 35 is effected continuously and at a high rate of speed through a sprocket and chain connection with the drive shaft 52. For this purpose, the cutter shaft 36 carries a sprocket 56 (Figs. 1 and 2) which is driven by an endless chain 57. The chain operates over a sprocket 58 mounted on the sprocket shaft 39 (see also Fig. 4). The sprocket 58 is formed integrally with a smaller driven sprocket 59 which is rotated by an endless drive chain 61. This drive chain is driven by a main drive sprocket 62 carried on the drive shaft 52.

During the fish locating and cutting operation the portion of the fish that extends beyond and ahead of the runway 21 is supported on a pivotally mounted shelf or movable support 65 (Fig. 5) which extends under the stop plate 28 and spans the space between this plate and the inner end of the runway 21. The shelf is formed on the lower end of a support arm 66 which is mounted on a cross shaft 67. The shaft is carried in a pair of spaced bearings 68, 69 (Figs. 1 and 4). The bearing 68 is formed on a web portion 71 which extends out laterally from the stop plate 28. The bearing 69 is formed on one of the sprocket shaft bearings 41.

As soon as the cutter 35 has severed a fish piece B from the fish mass A, the support shelf 65 is withdrawn from supporting position and this releases the cut fish piece which falls into a position for transfer to another portion of the machine. The fish piece during cutting is in a horizontal position, lying on its back this being the position in which the fish is conveyed along the runway 21.

The withdrawal of the support shelf 65 is brought about by cam action operating in time with the cutter swing arm 38. For this purpose the cross shaft 67 carries a lever 74 (Figs. 1 and 2) the outer end of which is connected to a depending actuating rod 75. The lower end of the rod is secured into a cam yoke 76 which straddles the drive shaft 52 adjacent an edge cam 77 mounted on the drive shaft. The yoke carries a cam roller 78 which operates on the cam. The roller is held against the cam by a spring 79 (Fig. 2). One end of the spring is hooked into a hole in the lever 74 while the opposite end is fastened to a lug 81 formed on the adjacent sprocket shaft bearing 41. Rotation of the cam 77 with the drive shaft 52 raises and lowers the rod 75 and thus rocks the cross shaft 67 and the support shelf 65 connected thereto through a withdrawing stroke and thence through a return stroke.

Upon the withdrawal of the support shelf 65 the released fish piece B is immediately pushed downwardly out of the path of travel of the fish advancing along the runway 21. This transfer of the fish piece B is effected by a transfer finger unit (Fig. 4) which is disposed adjacent the space between the stop plate 28 and the inner end of the runway.

There are two transfer fingers of the finger unit, designated by the numeral 85 and they are disposed on opposite sides of a rotatable hub 86 (Figs. 1 and 5). The hub is mounted on an actuating shaft 87 journaled in a long horizontal bearing 88 projecting outwardly from the web 71 of the stop plate 28. The shaft is rotated continuously by a gear 89 which is mounted on the outer end of the shaft. The gear 89 is rotated in the proper direction by a meshing gear 91 which is mounted on a short shaft 92 journaled in a long bearing 93 formed on the stop plate web 71.

The short shaft 92 is driven by a sprocket 94 mounted on the outer end of the shaft. This sprocket is rotated by an endless chain 95 (see Figs. 1, 2 and 4) which also operates over a pair of idler sprockets 96, 97 mounted on studs 98 secured in long bosses 99 projecting outwardly from the web 29 of the bearing bracket 31. The chain is operated by a sprocket 101 carried on the drive shaft 52.

Hence as the drive shaft 52 rotates, it operates the transfer fingers 85 in time with the cutter swing arm 38 and the other operating parts of the machine. The fingers rotate continuously and alternate in pushing cut fish pieces B out of the cut-off position in the machine. Guide rails 102 secured to the sides of the runway 21 guide the fish pieces during this transfer.

The cut fish pieces B during their transfer are received in a movable turn-over device 105 (Figs. 4 and 5) which operates to turn the fish pieces from a horizontal position into a vertical position to facilitate packing them into cans. This turn-over device comprises a rotatable turret 106 having a plurality of radial pockets 107. The turret is mounted on a turret shaft 108 which is carried in the bearing bracket 31 and in a similar bearing bracket 109 bolted to the machine frame 16.

The turret shaft 108 is rotated intermittently in order to bring each pocket 107 into alignment with the stop plate 28 and with the transfer fingers 85 for receiving the fish pieces B. This intermittent motion is brought about by an indexing disc 112 which is mounted on the turret shaft 108. The disc carries a plurality of cam rollers 113, one for each pocket 107, and these rollers are individually engageable in an interrupted cam groove 114 of a barrel cam 115 carried on the drive shaft 52. This is a conventional indexing mechanism.

Hence as the drive shaft 52 rotates, it turns the cam 115 in time with the operation of the cutter swing arm 38. For each rotation of the cam, one cam roller 113 is engaged in the cam groove 114 and is advanced angularly a distance sufficient to rotate the turret 112 from one pocket 107 to the next succeeding pocket. In this manner a new pocket is presented, each time the turret is rotated, for the reception of the following fish piece B. This same rotation of the turret carries a received fish piece B resting in its pocket 107, through one or more idle positions or stations and thence brings it into a vertical position, i. e., at an angle of ninety degrees from the stop plate 28. It is this turned position that is desirable to facilitate packing of the fish pieces into cans.

While the fish piece B is in its turned position and while the turret 106 is stationary after one of its rotations, the cut fish piece is swept out of its turret pocket and is advanced toward the canning end of the machine. This is done while maintaining the fish in its turned position. Removal of the fish piece from its turret pocket 107 is effected by a continuously rotating star wheel 120 (Fig. 1) having a plurality of fish propelling paddles or fingers 121. This star wheel is mounted on the upper end of a vertically disposed shaft 122 journaled in a bearing 123 (Fig. 2) in the machine frame 16. The shaft is rotated in any suitable manner in time with the other moving parts of the machine.

As a finger 121 sweeps through a pocket 107 of the turret it pushes out the turned fish piece and propels it along a curved path of travel toward the canning machine. A curved runway 124 of the canning machine is disposed adjacent the star wheel for guiding and supporting the moving fish pieces in their turned position. This runway includes a support plate 125, a pair of spaced and parallel side guides 126, and an upper support bearing 127 for the shaft 122.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fish canning machine, the combination of cutter means for cutting fish into pieces of predetermined measured length, a conveyor for feeding fish into said cutter means, a stop plate gauge located beyond said conveyor and in the path of the fish for gauging the length of fish to be cut, a pivotally mounted support adjacent said cutter means for supporting the pieces of fish to be cut off while being gauged and while being cut, a rotatable turret adjacent said cutter means and having a plurality of pockets for receiving the cut fish pieces and for turning them into a different position, a transfer finger for engaging the fish pieces after cutting and for moving them into a turret pocket, and a rotatable feeding device having a plurality of feeding fingers movable through the pockets of said turret for removing the turned fish pieces from said turret and for advancing them in their turned position for canning.

2. In a fish canning machine, the combination of means for cutting fish into pieces of predetermined measured length, a pivotally mounted support arm having a shelf thereon for supporting the part of the fish to be cut by said cutting means, rotatable means located below said cutting means for receiving the cut fish pieces and for turning them into a different position for canning, means for swinging said shelf on its pivotal mounting from fish supporting position as the fish is cut, transfer means disposed above said shelf, and means for moving said transfer means against the fish when said support shelf has been removed from supporting position for transferring the cut fish pieces to said rotatable means.

3. In a fish canning machine, the combination of means for cutting fish into pieces of predetermined measured length, an intermittently rotatable turret having radial pockets thereon disposed below said cutting means, actuating means for moving said turret to position one of said pockets beneath the measured fish being cut for receiving a cut fish piece preparatory to turning it into a different position for canning, a rotatable transfer finger disposed between said cutting means and said roatable turret for transferring the cut fish pieces to said rotatable turret, means for rotating said transfer finger in time with said cutter means to engage said cut fish pieces when said turret pocket is in receiving position, and rotatable means movable through the pockets of said turret when the latter is at rest for removing the turned fish pieces from said pockets and advancing said pieces for a subsequent canning operation.

4. In a fish canning machine, the combination of means for cutting fish into pieces of predetermined length, means for conveying fish to said cutting means, gauge means located in the path of the fish adjacent said cutting means and engageable by the fish for determining the length of a fish piece to be cut, a rotatable turret having peripheral pockets therein disposed adjacent said cutting means for receiving the cut fish pieces and for turning them into a different position for canning, and an intermittently removable support means for the cut fish pieces disposed between said conveying means and said turret.

5. In a fish canning machine, the combination of means for cutting fish into pieces of predetermined measured length, a movably mounted support member adjacent said cutting means for supporting each measured piece of fish to be cut, means for moving said support member from supporting position beneath each cut piece of fish to release the latter, a rotatable turret having peripheral pockets therein disposed adjacent said cutting means for receiving the cut fish pieces and for turning the same into a different position for canning, and a movable transfer member mounted adjacent said support member for successively transferring the cut fish pieces from supported position to said rotatable means at intervals when said support member is temporarily moved from fish supporting position by its said moving means.

6. In a fish canning machine, the combination of means for cutting fish into pieces of predetermined length, means for conveying fish to be cut to said cutting means, a pivotally mounted shelf disposed beneath said cutting means for supporting a measured piece of fish to be cut, means for swinging said shelf on its pivotal mounting into and out of fish supporting position, a turret having peripheral pockets therein rotatably mounted beneath said cutting means for receiving the successive fish pieces and for turning them into a different position for canning, and a rotatable transfer finger disposed above said turret adjacent said cutting means for successively forcing the cut pieces of fish down into the respective pockets of said rotatable turret at intervals when said shelf is temporarily swung out of fish supporting position.

7. In a fish canning machine, the combination of means for cutting fish into pieces of predetermined length, a movable support member for the cut fish pieces disposed adjacent said cutting means and having means for intermittently moving said member into and out of fish supporting position, a rotatable turret mounted adjacent said cutting means and having a plurality of pockets therein, a rotatable transfer finger disposed between said cutting means and said support member for successively transferring the cut fish pieces into the respective pockets of said turret, means for intermittently rotating said turret to position a said pocket for receiving a cut fish piece in vertical position when the turret is at rest and for thereafter rotating the turret to turn the received cut fish piece into a horizontal position, and a rotatable feeding finger disposed adjacent said turret and movable through the pockets thereof when the turret is at rest for successively removing the turned fish pieces from the turret and for advancing said pieces in their aforesaid vertical position for canning.

8. In a fish canning machine, the combination of a runway, means for conveying fish lengthwise through said runway, a rotatable cutter movably mounted above said runway for transversely cutting fish into pieces of predetermined length, a pivotal mounting for said cutter, means for rotating said cutter, means for bodily swinging said cutter toward and away from the fish on said runway for cutting the fish into said pieces, a movable shelf for the cut fish pieces disposed beneath said cutter adjacent the end of said runway, said shelf having means for intermittently moving the same into and out of fish supporting position, a rotatable turret having peripheral pockets therein disposed adjacent said shelf and cutter for receiving the cut fish pieces and for turning them into a different position for canning, means for rotating said turret in time with the swinging movement of said cutter, and a rotatable transfer finger disposed between said cutter and said support shelf for successively transferring the cut fish pieces into the respective pockets of said turret.

RONALD E. J. NORDQUIST.

REFERENCES CITED

The following references are of record in the file of this patent:

UNITED STATES PATENTS

| Number | Name | Date |
| --- | --- | --- |
| 890,250 | Thompson | June 9, 1908 |
| 1,827,553 | Algeo et al. | Oct. 13, 1931 |
| 1,935,891 | Schroeder | Nov. 21, 1933 |
| 2,037,724 | Jacobs et al. | Apr. 21, 1936 |
| 2,044,813 | Rooney | June 23, 1936 |
| 2,164,285 | Schutz | June 27, 1939 |
| 2,175,177 | Butler | Oct. 10, 1939 |
| 2,226,019 | Rooney | Dec. 24, 1940 |
| 2,246,839 | Christiansen | June 24, 1941 |